United States Patent
Lee et al.

(10) Patent No.: US 9,510,269 B2
(45) Date of Patent: Nov. 29, 2016

(54) METHOD AND SYSTEM FOR INITIALIZING RADIO NETWORK FOR RADIO MODULES IN VEHICLE

(71) Applicant: Hyundai Motor Company, Seoul (KR)

(72) Inventors: Jong Young Lee, Gyeonggi-Do (KR); Suk Young Rho, Gyeonggi-Do (KR); Hun Joung Yoon, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 4 days.

(21) Appl. No.: 14/477,070

(22) Filed: Sep. 4, 2014

(65) Prior Publication Data
US 2015/0230281 A1   Aug. 13, 2015

(30) Foreign Application Priority Data
Feb. 11, 2014  (KR) .................. 10-2014-0015223

(51) Int. Cl.
| | |
|---|---|
| *H04L 12/28* | (2006.01) |
| *H04W 48/10* | (2009.01) |
| *H04W 24/02* | (2009.01) |
| *H04W 48/16* | (2009.01) |

(52) U.S. Cl.
CPC ............. *H04W 48/10* (2013.01); *H04W 24/02* (2013.01); *H04W 48/16* (2013.01)

(58) Field of Classification Search
CPC ......................... H04W 76/023; H04W 48/10
USPC ....... 370/328, 329, 330, 312, 389–392, 351, 370/352, 332, 333; 455/515, 516
See application file for complete search history.

(56) References Cited

U.S. PATENT DOCUMENTS

| | | | |
|---|---|---|---|
| 6,876,642 B1 | 4/2005 | Adams et al. | |
| 2011/0065380 A1* | 3/2011 | Kawakami | H04L 45/122 455/7 |
| 2012/0057506 A1* | 3/2012 | Kumar | H04L 12/12 370/255 |
| 2013/0094481 A1* | 4/2013 | Jeong | H04W 72/0446 370/336 |
| 2013/0273835 A1* | 10/2013 | Myojo | H04B 7/15542 455/7 |
| 2015/0381518 A1* | 12/2015 | Lee | H04L 45/566 370/349 |
| 2015/0382206 A1* | 12/2015 | Williams | H01Q 1/246 370/329 |

FOREIGN PATENT DOCUMENTS

| | | |
|---|---|---|
| JP | 2009-234468 A | 10/2009 |
| KR | 10-2005-0118186 | 12/2004 |
| KR | 10-2010-0138449 | 12/2010 |
| KR | 10-2011-0065257 A | 6/2011 |
| KR | 10-1064183 | 9/2011 |
| KR | 10-2013-0119287 A | 10/2013 |

* cited by examiner

*Primary Examiner* — Chuong T Ho
(74) *Attorney, Agent, or Firm* — Mintz Levin Cohn Ferris Glovsky and Popeo, P.C.; Peter F. Corless (57) ABSTRACT

The present disclosure provides a method and system for initializing a radio network for radio modules mounted in a vehicle, which can efficiently establish a radio network formed among the radio modules. In the method, radio modules and coordinators, transmit radio communication beacon frames. Each radio module searches for peripheral nodes by receiving radio communication beacon frames from peripheral nodes and generates a neighbor table with respect to the searched peripheral nodes. Each radio module selects a coordinator, using the neighbor table, and requests a connection to the selected coordinator. The connection request of each radio module with respect to the coordinator is then processed.

11 Claims, 5 Drawing Sheets

| Node address | Node type (C/N) | Signal intensity (0~100) | Address of coordinator | Signal intensity of coordinator (0~100) |
|---|---|---|---|---|
| 125 | N | 10 | 20 | 80 |
| 10 | C | 80 | - | - |
| 20 | C | 15 | - | - |

| Node address | Node type (C/N) | Signal intensity (0~100) | Address of coordinator | Signal intensity of coordinator (0~100) |
|---|---|---|---|---|
| 125 | N | 10 | 20 | 80 |
| 10 | C | 80 | - | - |
| 20 | C | 15 | - | - |

METHOD AND SYSTEM FOR INITIALIZING RADIO NETWORK FOR RADIO MODULES IN VEHICLE

CROSS-REFERENCE TO RELATED APPLICATION

This application claims under 35 U.S.C. §119(a) priority to and the benefit of Korean Patent Application No. 10-2014-0015223 filed on Feb. 11, 2014, the entire contents of which are incorporated herein by reference.

BACKGROUND (a) Technical Field

The present disclosure relates to a method for initializing a radio network for radio modules in a vehicle. More particularly, the present disclosure relates to a method for initializing a radio network for radio modules in a vehicle, which can efficiently constitute a radio network formed between/among the radio modules mounted in the vehicle.

(b) Background Art

In general, a user, conventionally speaking, manually sets radio modules mounted in a vehicle and connected to a control unit, such that the radio modules repeatedly transmit and receive the same message n times or more. For example, the radio modules can be a radio door control module or the like. However, when this conventional method is used, the user may be inconvenienced by requiring a knowledge of potentially complicated radio communication techniques=, or there may be a problem where another device near the vehicle is erroneously recognized as the same device.

SUMMARY OF THE DISCLOSURE

The present disclosure provides a method for initializing a radio network for radio modules in a vehicle, which can constitute an efficient radio network, regardless of interference caused by radio modules mounted in peripheral vehicles (e.g., in a vehicle assembling or repairing process) or interference caused by a vehicle structure and an assembler or repairman.

In one aspect, the present disclosure provides a method for initializing a radio network for radio modules mounted in a vehicle, the method including: transmitting, at each of the radio modules, radio communication beacon frames; searching, at each of the radio modules, peripheral nodes based on radio communication beacon frames received from peripheral nodes; generating, at each of the radio modules, a neighbor table with respect to the searched peripheral nodes; selecting, at each of the radio modules, a coordinator, using the neighbor table; requesting, at each of the radio modules, a connection to the coordinator selected by the respective radio module; and processing the connection request of each radio module with respect to the selected coordinator.

According to embodiments of the present disclosure, in the requesting of the connection to the coordinator, when a number of the searched peripheral nodes is two or more, each radio module may select the coordinator by performing a coordinator selection process, and request a connection to the selected coordinator.

According to embodiments of the present disclosure, in the requesting of the connection to the coordinator, when the number of the searched peripheral nodes is one, each radio module may immediately request a connection to the coordinator without performing the coordinator selection process.

According to embodiments of the present disclosure, in the coordinator selection process, a coordinator having the best signal intensity among coordinators may be selected, and a coordinator of a radio module having the best signal intensity among the radio modules connected to the coordinator may be selected. When the two coordinators correspond to each other, the corresponding coordinator may be selected as a coordinator for transmitting a connection request.

According to embodiments of the present disclosure, in the coordinator selection process, a coordinator having the best signal intensity among coordinators may be selected, and a coordinator of a radio module having the best signal intensity among the radio modules connected to the coordinator may be selected. When the two coordinators do not correspond to each other, different basic weights may be provided to the respective coordinators, based on radio signal intensities of the coordinators, in case of a coordinator connected to radio modules, such that an additional weight may be further provided to the coordinator connected to the radio modules, based on radio signal intensities of the connected radio modules, and the coordinator of the two coordinators having the greatest total weight, which is obtained by adding up the basic weight and the additional weight, may be selected as a coordinator for transmitting a connection request.

According to embodiments of the present disclosure, in the requesting of the connection to the coordinator, when receiving a failure message from the coordinator in response to the connection request, each radio module may wait for a predetermined time, regenerate a neighbor table by re-searching for peripheral nodes, and then retry a connection to the coordinator, using the regenerated neighbor table.

According to embodiments of the present disclosure, in the requesting of the connection to the coordinator, when the number of radio modules currently connected to the coordinator is less than the maximum number of child radio modules, the coordinator may accept the connection request of the radio module. When the number of radio modules currently connected to the coordinator is not less than the maximum number of child radio modules, the coordinator may deny the connection request of the radio module.

According to embodiments of the present disclosure, in the requesting of the connection to the coordinator, when the coordinator accepts the connection request of the radio module, each of the coordinator and the radio module may broadcast a notification message for notifying peripheral nodes.

According to embodiments of the present disclosure, in the requesting of the connection to the coordinator, when information of the currently connected coordinator is different from that of the coordinator obtained from the notification message, each radio module may renew information of a neighbor table, re-select a coordinator, using the renewed neighbor table, and request a connection to the re-selected coordinator.

According to embodiments of the present disclosure, in the generating of the neighbor table with respect to the peripheral nodes, the neighbor table may store a node address, a node type and a radio signal intensity, obtained from one or more of the radio communication beacon frames. When a peripheral node and a radio module are connected to the same coordinator, the neighbor table may store an address of the coordinator, a radio signal intensity of the coordinator, a node type and a radio signal intensity, obtained from a radio communication beacon frame of the radio module.

According to embodiments of the present disclosure, in the transmitting of the radio communication beacon frames, each of the radio module and the selected coordinator may transmit a radio communication beacon frame periodically or in the generation of a request from the radio module.

Furthermore, according to embodiments of the present disclosure, a system of radio modules mounted in a vehicle is disclosed, whereby the system of radio modules is configured to perform a method for initializing a radio network in accordance with the various steps and procedures outlined above.

Other aspects and exemplary embodiments of the disclosure are discussed infra.

The method and system according to the present disclosure have the benefit of various advantages. First, the radio modules mounted in the vehicle can select a coordinator, using information of neighbor nodes, so that it is possible to prevent unintentionally creating an unnecessary network and reduce the time for initializing the radio network. Second, it is possible to maintain network efficiency by considering interference caused by the peripheral environment. Third, when the network between nodes in the vehicle is erroneously created due to interference caused by the peripheral environment, it is possible to correct such an error through information obtained from peripheral nodes, and the like. Thus, when nodes in another vehicle are recognized due to a peripheral environment, etc., it is possible to maintain a normal network through automatic renewal, thereby ensuring the safety of the vehicle. Fourth, it is possible to maintain a network through automatic settings in the assembling or renewing process of the vehicle, thereby enhancing a user's convenience.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the contents of the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that one or more of the below methods may be executed by at least one control unit (e.g., "coordinator") for controlling the radio modules. The term "control unit" or "control node" or "control module" (each of which may be used interchangeably) may refer to a hardware device that includes a memory and a processor. The memory is configured to store program instructions, and the processor is configured to execute the program instructions to perform one or more processes which are described further below.

Figure 1:
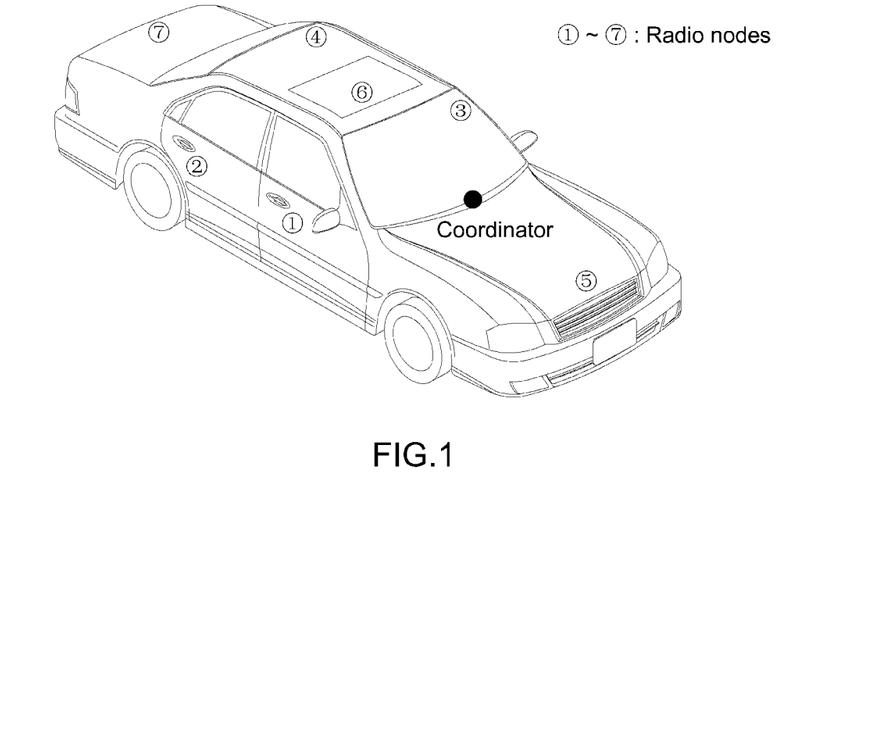
FIG. 1 is an exemplary view showing radio modules respectively mounted at door portions and the configuration of a control node (coordinator) for controlling the radio modules.

As shown in FIG. 1, a plurality of radio modules for respectively controlling actuators of door portions may be mounted in a vehicle, and the vehicle may be provided with a coordinator for controlling each radio module.

After a power source built in the vehicle supplies power, each radio module operated by the power supplied from the power source is connected to the coordinator mounted in the same vehicle by searching for neighbor nodes, and then performs an operation of opening/closing the door according to a control command through the connected coordinator.

The present disclosure provides a method for initializing a radio network for radio modules mounted in a vehicle. In the method, a coordinator is selected using information on neighbor nodes (peripheral nodes), so that it is possible to prevent a time delay due to the constitution of an unnecessary network. Further, when a wrong coordinator is selected due to interference generated by a peripheral environment, the selection error is automatically corrected, so that it is possible to improve the reliability of a system and to constitute an efficient network.

Figure 2:
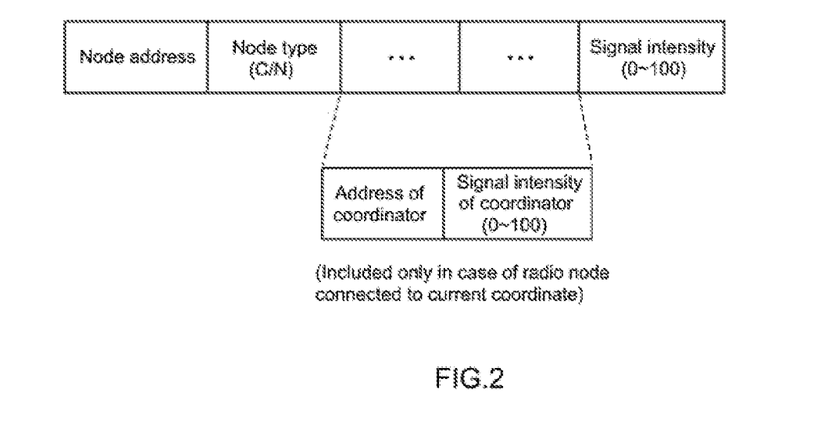
FIG. 2 is an exemplary view showing the configuration of a radio communication beacon frame used in the present disclosure.
Figure 3:
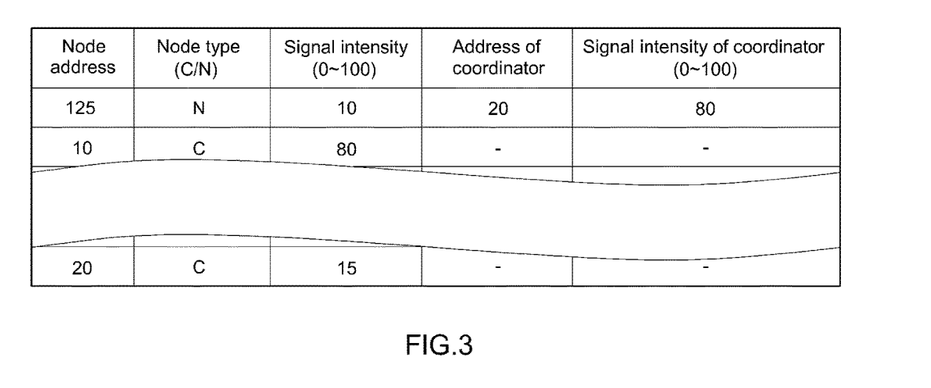
FIG. 3 is an exemplary view showing a neighbor table used in the present disclosure.

Each of the radio modules (or radio node) and the coordinator, mounted in the vehicle, transmits a radio communication beacon frame periodically or in the generation of a request from the radio modules. For example, the radio communication beacon frame may be configured as shown in FIG. 2.

The address of the radio module or the coordinator is included in the radio communication beacon frame. When the beacon frame is received at a reception node, the signal intensity of the reception node is measured and then transmitted to an upper-level application. If a radio module is connected to a current coordinator, the radio module transmits a radio communication beacon frame including the address of the connected coordinator and the signal intensity of the coordinator.

Figure 4:
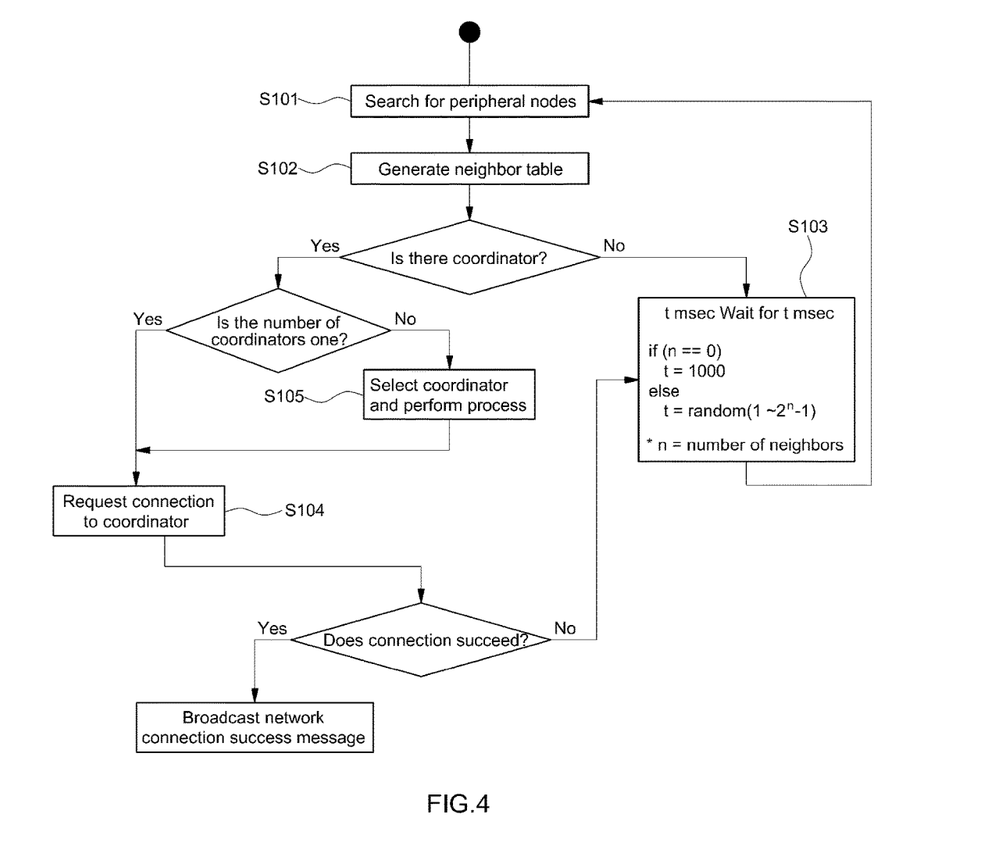
FIGS. 4 to 7 are flowcharts illustrating a method for initializing a radio network for radio modules in a vehicle according to an embodiment of the present disclosure.

As shown in FIG. 4, each radio module mounted in the vehicle searches for peripheral nodes (peripheral radio modules and coordinators) through a radio communication beacon frame (S101), and writes and generates a neighbor table (S102). The neighbor table stores node addresses, node types and radio signal intensities, obtained from beacon frames of the neighbor nodes. Particularly, as shown in FIG. 2, the neighbor table with respect to a radio module connected to a coordinator stores an address of the coordinator, a radio signal intensity of the coordinator, a node type and a radio signal intensity, obtained from a beacon frame of the radio module. The radio module selects a coordinator, using the neighbor table, and requests a connection to the selected coordinator. When receiving a failure message for the connection request from the coordinator, the radio module waits for a predetermined time (S103) and then regenerates a neighbor table by re-searching for peripheral nodes. The radio module retries a connection to the coordinate, using the regenerated neighbor table.

Referring to FIG. 4, when receiving the failure message for the connection request from the coordinator, the radio module retries a connection to the coordinator in one second when there is no coordinator among the searched neighbor nodes. When there is a coordinator among the searched peripheral nodes, the radio module retries a connection to the coordinator within '1 to $2^n-1$ msec'. Here, the n is the number of coordinators near the radio module. When succeeding in the connection to the coordinator, the radio module transmits a network connection success message to peripheral radio modules through broadcasting. The network connection success message is used for selection of a coordinator and error correction in the occurrence of an error.

In the connection of the radio module to the coordinator, when the number of coordinators is one, as the search result of peripheral nodes, the radio module immediately request a connection to the coordinator without passing through another process for selecting the coordinator (S104). On the other hand, when the number of coordinators is two or more, the radio module selects a coordinator by performing a coordinator selection process (S105), as described below, and requests a connection to the selected coordinator.

Figure 5:
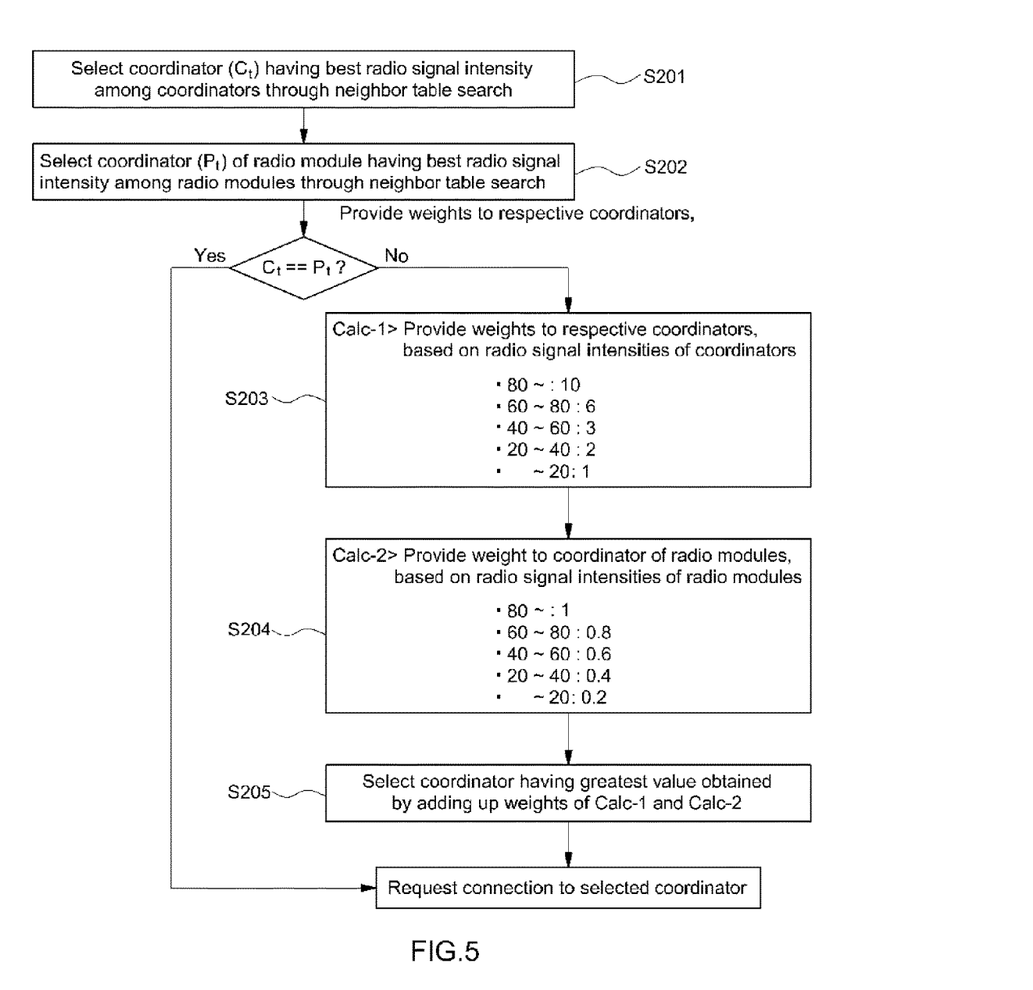

As shown in FIG. 5, in the coordinator selection process, a coordinator ($C_t$) having the best signal intensity (the greatest value of signal intensity) among coordinators near the radio module is selected (S201), and a coordinator ($P_t$) of a radio module having the best signal intensity (i.e., the greatest value of signal intensity) among radio modules connected to the coordinator is selected (S202). When the two coordinators ($C_t$ and $P_t$) correspond to each other, the corresponding coordinator is selected as a coordinator for transmitting a connection request. When the two coordinators ($C_t$ and $P_t$) do not correspond to each other, however, weights are provided to each coordinator, and the coordinator having the greatest total weight is selected as a coordinator for transmitting a connection request. Specifically, in the coordinator selection process, when the two coordinators ($C_t$ and $P_t$) do not correspond to each other, different basic weights are provided to the respective coordinators, based on radio signal intensities of the coordinators (S203). In case of a coordinator being connected to radio modules, an additional weight is further provided to the coordinator connected to the radio modules, based on radio signal intensities of the connected radio modules (S204), and the total weights of each, which are obtained by adding up the basic weight and the additional weight, are then compared with each other. As a result, the coordinator having the greatest total weight is selected as a coordinator for transmitting a connection request (S205).

In this case, the basic weight provided based on the radio signal intensity of the coordinator and the additional weight provided based on the radio signal intensity of the radio module connected to the coordinator are set using different references. Thus, the basic weight and the additional weight with respect to the radio signal intensity included within the same range are provided with different values. This is for the purpose of reflecting connection states of neighbor nodes to a coordinator when an obstacle or interference occurs that may exist due to the peripheral environment. In addition, the basic weight and the additional weight are set based on the radio signal intensity of the coordinator prior to that of the radio module.

Figure 6:
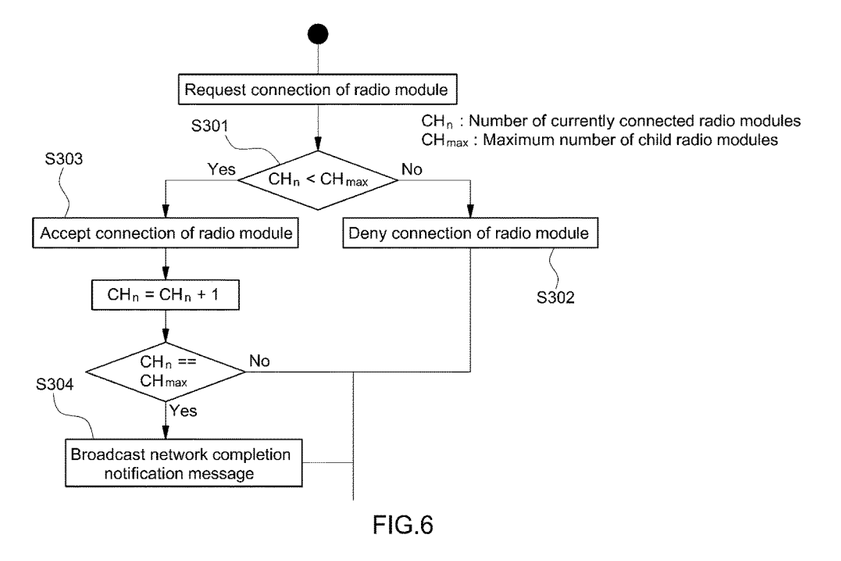

As shown in FIG. 6, when a radio module requests a connection to a coordinator, the number ($CH_n$) of radio modules currently connected to the coordinator is compared with a predetermined maximum number ($CH_{max}$) of child radio modules (S301). When the number ($CH_n$) of radio modules currently connected to the coordinator is not less than the predetermined maximum number ($CH_{max}$) of child radio modules, the coordinator denies the connection request of the radio module (S203). When the number ($CH_n$) of radio modules currently connected to the coordinator is less than the predetermined maximum number ($CH_{max}$) of child radio modules by detecting the number ($CH_n$) of radio modules currently connected to the coordinator, the coordinator accepts the connection request of the radio module (radio module requesting the connection to the coordinator) (S303).

The predetermined maximum number ($CH_{max}$) of child radio modules is the maximum value of the number of radio modules connectable to the coordinator. For example, the radio module receiving the acceptance of the connection request generates and broadcasts a network connection success notification message for notifying peripheral nodes. If the number ($CH_n$) of radio modules currently connected to the coordinator becomes equal to the predetermined maximum number ($CH_{max}$) of child radio modules after the connection of the radio module is accepted, the coordinator (coordinator accepting the connection of the radio module) generates and broadcasts a network completion notification message for notifying peripheral nodes (S304).

When a radio module is connected to a coordinator under the request of the radio module as described above, the coordinator currently connected to the radio module and the coordinator of the network connection success notification message may be different nodes due to an error in the selection and/or connection of the coordinator. For example, as a radio module selects a control node of another vehicle in a specific situation, the radio module may be connected to the wrongly selected coordinator.

Figure 7:
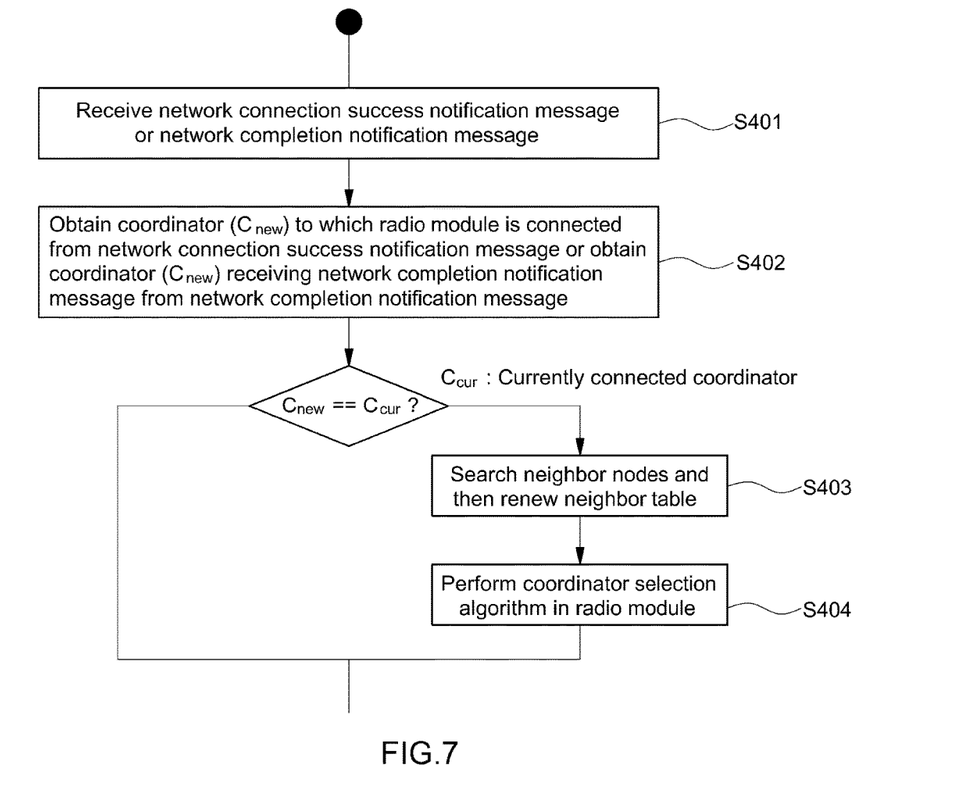

A process shown in FIG. 7 is performed in order to correct an error in the selection and connection of a coordinator. As shown in FIG. 7, if a radio module generates a network connection success notification message or receives a network completion notification message of a coordinator (S401), the radio module obtains information of a coordinator ($C_{new}$) to which the radio module is connected from the network connection success notification message or obtains information of the coordinator ($C_{new}$) receiving the network completion notification message from the network completion notification message (S402). Accordingly, the radio module can decide whether an error occurs by comparing information of a coordinator ($C_{cur}$) currently connected thereto with that of the coordinator (coordinator to which the radio module is connected, $C_{new}$) obtained from the notification message. In other words, the radio module can recognize whether an error in the selection/connection of a coordinator occurs by comparing the address of the currently connected coordinator ($C_{cur}$) with that of the coordinator ($C_{new}$) obtained from the network connection success notification message or network completion notification message.

When the currently connected coordinator ($C_{cur}$) is different from the coordinator ($C_{new}$) recognized through the notification message, i.e., when a coordinator is wrongly selected, the radio module renews information on the neighbor table of radio modules and coordinators by re-searching for peripheral nodes (S403). Then, the radio module re-selects a coordinator, using the renewed neighbor table, and requests a connection to the re-selected coordinator (S404). The coordinator selection and connection process described above is re-performed using the renewed neighbor table, so that it is possible to correct an error in the selection and connection of the coordinator.

The contents of the disclosure have been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A method for initializing a radio network using radio modules mounted in a vehicle, the method comprising:
   transmitting, at each of the radio modules, radio communication beacon frames;
   searching, at each of the radio modules, for peripheral nodes based on radio communication beacon frames received from peripheral nodes;
   generating, at each of the radio modules, a neighbor table with respect to the searched peripheral nodes;
   selecting, at each of the radio modules, a coordinator, using the neighbor table of the respective radio module;
   requesting, at each of the radio modules, a connection to the coordinator selected by the respective radio module; and
   processing the connection request of each radio module with respect to the selected coordinator, wherein
   in the generating of the neighbor table with resect to the searched peripheral nodes, the neighbor table stores a node address, a node type, and a radio signal intensity, each obtained from one or more of the radio communication beacon frames, and
   when a peripheral node and a radio module are connected to the same coordinator, the neighbor table stores an address of the coordinator, a radio signal intensity of the coordinator, a node type, and a radio signal intensity, each obtained from a radio communication beacon frame of the radio module.

2. The method of claim 1, wherein, in the requesting of the connection to the coordinator, when a number of the searched peripheral nodes is two or more, each radio module selects the coordinator by performing a coordinator selection process, and requests a connection to the selected coordinator.

3. The method of claim 2, wherein, in the requesting of the connection to the coordinator, when the number of the searched peripheral nodes is one, each radio module immediately requests a connection to the coordinator without performing the coordinator selection process.

4. The method of claim 2, wherein, in the coordinator selection process, a coordinator having the best signal intensity among coordinators is selected, and a coordinator of a radio module having the best signal intensity among the radio modules connected to the coordinator is selected, and
   when the two coordinators correspond to each other, the corresponding coordinator is selected as a coordinator for transmitting a connection request.

5. The method of claim 2, wherein, in the coordinator selection process, a coordinator having the best signal intensity among coordinators is selected, and a coordinator of a radio module having the best signal intensity among the radio modules connected to the coordinator is selected,
   when the two coordinators do not correspond to each other, different basic weights are provided to the respective coordinators, based on radio signal intensities of the coordinators, such that an additional weight is further provided to the coordinator connected to the radio modules, based on radio signal intensities of the connected radio modules, and
   the coordinator of the two coordinators having the greatest total weight, which is obtained by adding up the basic weight and the additional weight, is selected as a coordinator for transmitting a connection request.

6. The method of claim 1, wherein, in the requesting of the connection to the coordinator, when receiving a failure message from the coordinator in response to the connection request, each radio module waits for a predetermined time, regenerates a neighbor table by re-searching for peripheral nodes, and then retries a connection to the coordinator, using the regenerated neighbor table.

7. The method of claim 1, wherein, in the requesting of the connection to the coordinator, when a number of radio modules currently connected to the coordinator is less than a maximum number of child radio modules, the coordinator accepts the connection request of the radio module, and
   when the number of radio modules currently connected to the coordinator is not less than the maximum number of child radio modules, the coordinator denies the connection request of the radio module.

8. The method of claim 1, wherein, in the requesting of the connection to the coordinator, when the coordinator accepts the connection request of the radio module, each of the coordinator and the radio module broadcasts a notification message for notifying peripheral nodes.

9. The method of claim 1, wherein, in the requesting of the connection to the coordinator, when information of the currently connected coordinator is different from that of the coordinator obtained from the notification message, each radio module renews information of a neighbor table, re-selects a coordinator, using the renewed neighbor table, and requests a connection to the re-selected coordinator.

10. The method of claim 1, wherein, in the transmitting of the radio communication beacon frames, each of the radio module and the selected coordinator transmits a radio communication beacon frame periodically or in the generation of a request from the radio module.

11. A method for initializing a radio network using radio modules mounted in a vehicle, the method comprising:
   transmitting, at each of the radio modules, radio communication beacon frames;
   searching, at each of the radio modules, for peripheral nodes based on radio communication beacon frames received from peripheral nodes;
   generating, at each of the radio modules, a neighbor table with respect to the searched peripheral nodes;
   selecting, at each of the radio modules, a coordinator, using the neighbor table of the respective radio module;
   requesting, at each of the radio modules, a connection to the coordinator selected by the respective radio module; and
   processing the connection request of each radio module with respect to the selected coordinator, wherein
   in the requesting of the connection to the coordinator, when a number of the searched peripheral nodes is two or more, each radio module selects the coordinator by performing a coordinator selection process, and requests a connection to the selected coordinator,
   in the coordinator selection process, a coordinator having the best signal intensity among coordinators is selected, and a coordinator of a radio module having the best signal intensity among the radio modules connected to the coordinator is selected,
   when the coordinator having the best signal intensity among coordinators does not correspond to the coordinator of a radio module having the best signal intensity among the radio modules, different basic weights are provided to the respective coordinators, based on radio signal intensities of the coordinators, such that an additional weight is further provided to the coordinator connected to the radio modules, based on radio signal intensities of the connected radio modules, and
   the coordinator having the greatest total weight between the coordinator having the best signal intensity among coordinators and the coordinator of a radio module having the best signal intensity among the radio modules, the total weight obtained by adding up the basic weight and the additional weight, is selected as a coordinator for transmitting a connection request.

* * * * *